US010223168B2

(12) United States Patent
Fukumoto et al.

(10) Patent No.: US 10,223,168 B2
(45) Date of Patent: Mar. 5, 2019

(54) PARALLEL PROCESSING OPTIMIZATION METHOD, AND INFORMATION PROCESSING DEVICE

(71) Applicant: FUJITSU LIMITED, Kawasaki-shi, Kanagawa (JP)

(72) Inventors: Naoto Fukumoto, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 882 days.

(21) Appl. No.: 14/310,679

(22) Filed: Jun. 20, 2014

(65) Prior Publication Data

US 2015/0025848 A1   Jan. 22, 2015

(30) Foreign Application Priority Data

Jul. 19, 2013  (JP) .................................. 2013-150945

(51) Int. Cl.
    *G06F 9/46*    (2006.01)
    *G06F 9/50*    (2006.01)
(52) U.S. Cl.
    CPC ...... *G06F 9/5061* (2013.01); *G06F 2209/501* (2013.01)
(58) Field of Classification Search
    CPC .................. G06F 9/5061; G06F 2209/501
    See application file for complete search history.

(56) References Cited

U.S. PATENT DOCUMENTS

| 8,543,993 | B2 * | 9/2013 | Yamashita | G06F 8/4432 717/150 |
| 2005/0289365 | A1 * | 12/2005 | Bhandarkar | G06F 1/3203 713/300 |
| 2006/0010432 | A1 | 1/2006 | Iwashita | |
| 2006/0095807 | A1 * | 5/2006 | Grochowski | G06F 1/206 713/324 |
| 2007/0300239 | A1 * | 12/2007 | Adam | G06F 9/505 719/320 |
| 2011/0213950 | A1 * | 9/2011 | Mathieson | G06F 1/206 712/30 |
| 2013/0013392 | A1 * | 1/2013 | Kejariwal | G06Q 30/0241 705/14.42 |

FOREIGN PATENT DOCUMENTS

| JP | 2001-282553 | 10/2001 |
| JP | 2006-24088 | 1/2006 |
| WO | 2004044745 | 5/2004 |

OTHER PUBLICATIONS

JPOA—Japanese Office Action dated Feb. 21, 2017 for Japanese Patent Application No. 2013-150945, with English translation.
(Continued)

*Primary Examiner* — Camquy Truong
(74) *Attorney, Agent, or Firm* — Fujitsu Patent Center

(57) ABSTRACT

A specification unit specifies numbers of cores executing processing when a predetermined number of processings to be executed in parallel is allocated to cores by same amount by changing number of processings to be allocated within a range of numbers of cores capable of executing parallel processing. A determination unit determines number of cores with highest processing performance as the number of cores executing the parallel processing from among the specified numbers of cores.

5 Claims, 14 Drawing Sheets

(56) References Cited

OTHER PUBLICATIONS

Imamura et al., "Improving performance of many-core processors through dynamic core-count and frequency scaling", Journal of the information processing society of Japan,vol. 5 No. 4 Aug. 24-35, 2012, 2012-00701-002. [See JPOA filed herewith and English Abstract].

Takahata et al., "Tuning parallel granularity in the SISAL compiler for fine-grain parallel architectures", Journal of the information processing society of Japan,vol. 39 No. 6, Jun. 1998, 2000-00926-013. [See JPOA filed herewith and English Abstract].

\* cited by examiner

|  | ALL SEARCHES | HILL-CLIMB | CONVEN-TIONAL ALL SEARCHES | CONVEN-TIONAL HILL-CLIMB |
|---|---|---|---|---|
| TRIAL TIMES | 28 | 2 | 60 | 2 |
| ACCURACY | 0.98 | 0.98 | 1.00 | 0.95 |

|  | ALL SEARCHES | HILL-CLIMB | CONVENTIONAL ALL SEARCHES | CONVENTIONAL HILL-CLIMB |
|---|---|---|---|---|
| TRIAL TIMES | 79 | 6 | 240 | 44 |
| ACCURACY | 1.00 | 1.00 | 1.00 | 0.99 |

PARALLEL PROCESSING OPTIMIZATION METHOD, AND INFORMATION PROCESSING DEVICE

CROSS-REFERENCE TO RELATED APPLICATIONS

This application is based upon and claims the benefit of priority of the prior Japanese Patent Application No. 2013-150945, filed on Jul. 19, 2013, the entire contents of which are incorporated herein by reference.

FIELD

The embodiments discussed herein are related to a parallel processing optimization program, a parallel processing optimization method, and an information processing device.

BACKGROUND

In recent years, a multi-core processor with a plurality of cores is the mainstream. The multi-core processor can enhance its processing performance by performing parallel processing using the cores. For the multi-core processor, the number of cores on a chip tends to be increased with the advancement of a microfabrication technique, and those with tens of cores are sold.

Patent Literature 1: Japanese Laid-open Patent Publication No. 2001-282553
Patent Literature 2: International Publication Pamphlet No. WO 2004/044745
Patent Literature 3: Japanese Laid-open Patent Publication No. 2006-24088

There are some programs for performing parallel processing that can achieve high performance by performing parallel processing in all the cores of the multi-core processor. There are also some programs that can obtain high performance by stopping part of cores. For example, there may be some cases in which higher performance can be achieved by stopping part of cores in a program with frequent synchronizations between the cores and in a program with bottleneck caused by memory bandwidth.

According to one aspect of the present invention, the parallel processing optimization program causes a computer to execute specifying numbers of cores executing processing when a predetermined number of processings to be executed in parallel is allocated to cores by the same amount by changing number of processings to be allocated within a range of numbers of cores capable of executing parallel processing. The parallel processing optimization program also causes the computer to execute determining the number of cores with highest processing performance as the number of cores executing the parallel processing from among the specified numbers of cores within the range of the numbers of cores capable of executing the parallel processing.

SUMMARY

According to an aspect of an embodiment, a computer-readable recording medium stores therein a program. The program causes a computer to execute a process that includes specifying numbers of cores executing processing when a predetermined number of processings to be executed in parallel is allocated to cores by same amount by changing number of processings to be allocated within a range of numbers of cores capable of executing parallel processing; and determining number of cores with highest processing performance as the number of cores executing the parallel processing from among the specified numbers of cores.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to accompanying drawings.

It is noted that this invention is not limited by the embodiments. In addition, the embodiments can be appropriately combined with each other in a scope where processing contents do not contradict each other.

[a] First Embodiment

Overall Configuration

Figure 1:
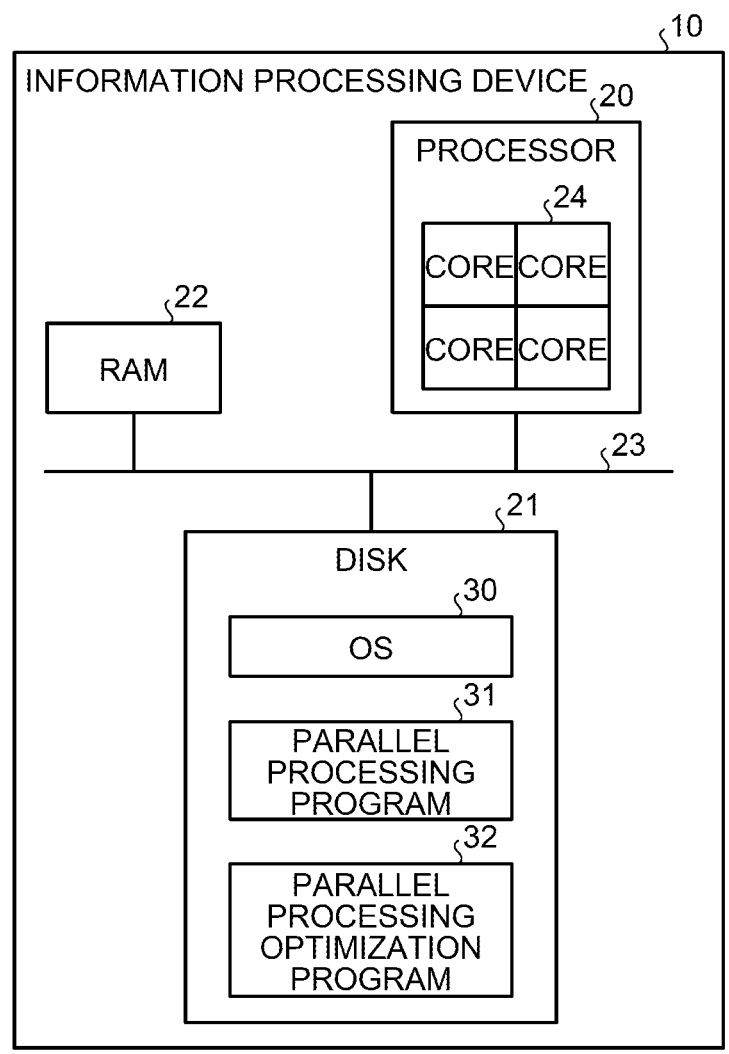
FIG. 1 is a diagram of an example of a schematic configuration of an information processing device.

A configuration of an information processing device 10 according to a first embodiment will be explained below. FIG. 1 is a diagram of an example of a schematic configuration of the information processing device.

The information processing device 10 is a device that performs information processing, such as personal computers, server computers, and work stations. The information processing device 10 may be a mobile terminal such as smartphones, tablet terminals, and personal digital assistants (PDA). As illustrated in FIG. 1, the information processing device 10 includes a processor 20, a DISK 21, and a random access memory (RAM) 22. The processor 20, the DISK 21, and the RAM 22 are connected to each other via a bus 23. The information processing device 10 may include various function units obtained by existing information processing device 10 in addition to the function units illustrated in FIG. 1. For example, the information processing device 10 may include other function units such as a communication interface, an operating unit including a keyboard, a mouse, and so on, and a display unit.

The processor 20 is a multi-core processor that includes a plurality of cores 24 and executes arithmetic processing. The processor 20 is capable of executing arithmetic processing in parallel using the cores 24. The example illustrated in FIG. 1 represents a case where the processor 20 has four cores 24; however, the number of cores 24 is not limited thereto. The number of cores on a chip of the multi-core processor is increasing with the advancement of the microfabrication technique. For example, Intel Xeon Phi Coprocessor 5110P includes 60 cores 24.

The DISK 21 is a device that stores various pieces of information. For example, the DISK 21 stores therein operating system (OS) 30, a parallel processing program 31, and a parallel processing optimization program 32. A hard disk drive (HDD), a solid state drive (SSD), and the like are exemplified as the DISK 21. Instead of the DISK 21, a nonvolatile semiconductor memory such as a flash memory may be used as a device that stores therein various pieces of information.

The OS 30 is software that provides commonly used basic functions from many pieces of application software and manages the whole computer. The OS 30 is executed by the processor 20 upon activation of the information processing device 10.

The parallel processing program 31 is application software executed in the information processing device 10. The parallel processing program 31 includes processing capable of parallel processing. For example, the parallel processing program 31 includes processing capable of parallel processing such as loop processing.

The parallel processing optimization program 32 is a program for controlling and optimizing the parallel processing. For example, the parallel processing optimization program 32 optimizes the number of cores caused to execute processing upon execution of the parallel processing.

The RAM 22 is a device that temporarily stores various data. The OS 30 and the various data used by the application software are loaded into and stored in the RAM 22.

Figure 2:
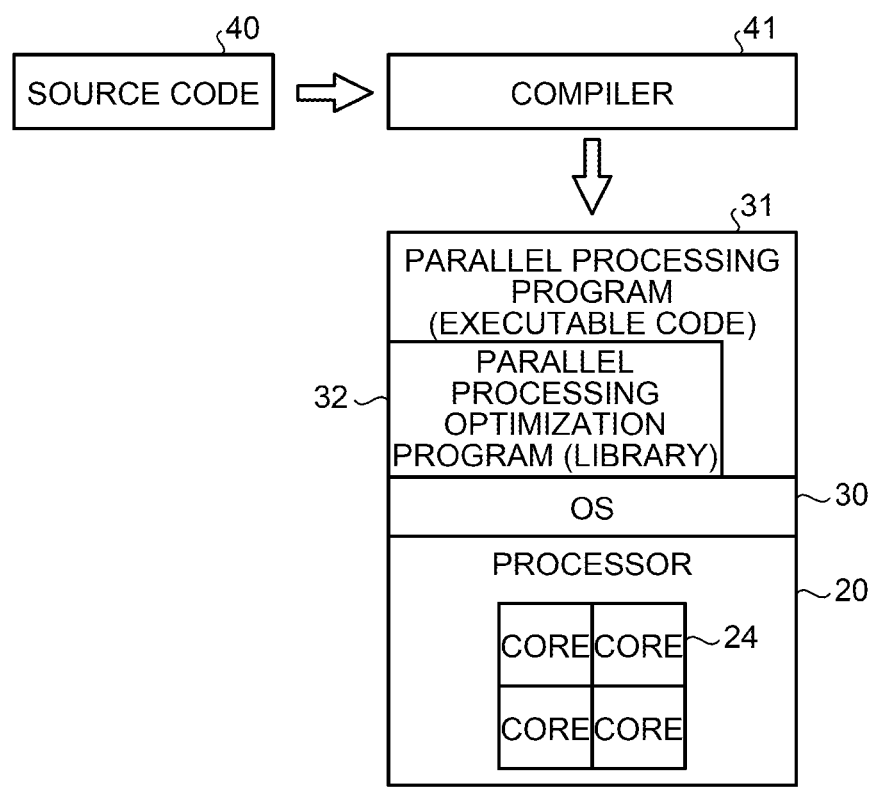
FIG. 2 is a diagram for explaining a relationship between hardware and software in the information processing device.

A relationship between hardware and software in the information processing device 10 is explained next with reference to FIG. 2. FIG. 2 is a diagram for explaining the relationship between hardware and software in the information processing device. The example illustrated in FIG. 2 represents the OS 30, the parallel processing program 31, and the parallel processing optimization program 32 as software.

The OS 30 manages the whole computer and provides basic functions as the OS 30 such as monitoring of the application programs and the hardware, and interrupt processing. For example, the OS 30 provides functions such as monitoring of statuses of the cores 24 of the processor 20 and interrupt processing to the cores 24.

The parallel processing program 31 is generated by a compiler 41 compiling source code 40 written in a predetermined program description language. The parallel processing program 31 includes processing capable of parallel processing such as loop processing.

Figure 3:
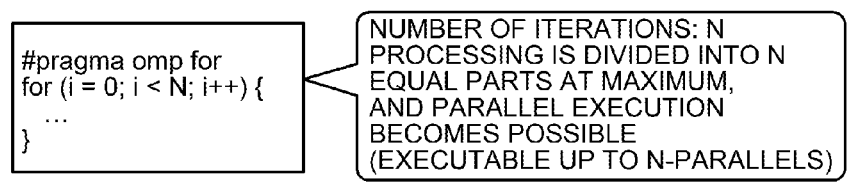
FIG. 3 is a diagram of processing capable of parallel processing.

FIG. 3 is a diagram of an example of processing capable of parallel processing. The example of FIG. 3 represents loop processing in which an initial value of a variable i is set to 0, the value of the variable i is added one by one each time one processing is executed, and the processing is repeated during a period during which the value of the variable i is smaller than N. The loop processing for repeating the processing N times is capable of dividing each processing repeated N times into N equal parts at a maximum and performing the processings in parallel. The number of repetition times of the repeatedly performed processing such as the loop processing is also called the "Number of Iterations". The example of FIG. 3 represents the loop processing in which the number of iterations is N.

Referring back to FIG. 2, the parallel processing optimization program 32 is provided as, for example, a library. The parallel processing optimization program 32 is linked to the parallel processing program 31 when the source code 40 is compiled. The parallel processing optimization program 32 is called when the parallel processing program 31 executes the parallel processing to control allocation of processing to the cores 24 of the processor 20 via the OS 30. The link between the parallel processing program 31 and the parallel processing optimization program 32 may be a static link or a dynamic link.

Figure 4:
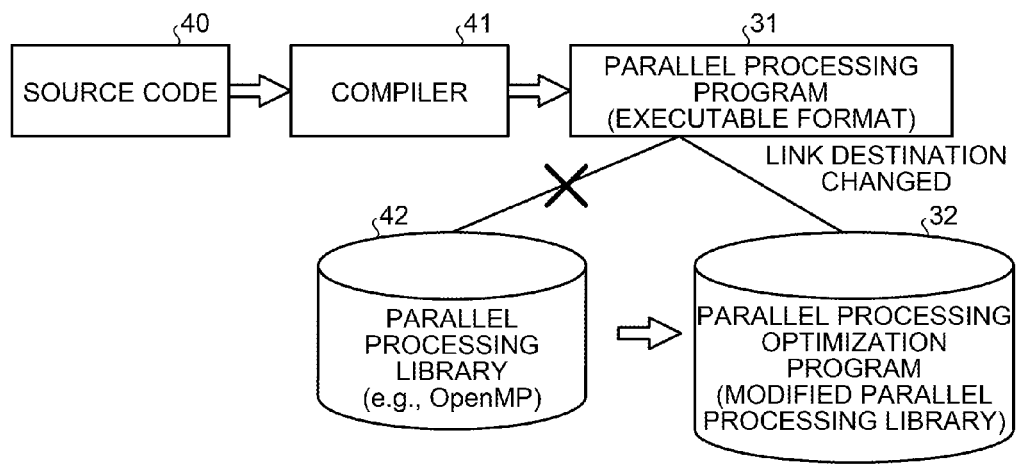
FIG. 4 is a diagram of an example of how a parallel processing program and a parallel processing optimization program are statically linked to each other.

FIG. 4 is a diagram of an example of how the parallel processing program and the parallel processing optimization program are statically linked to each other. For example, a modification is performed on an existing parallel processing library 42 to generate the parallel processing optimization program 32. For example, OpenMP is exemplified as the existing parallel processing library 42. A link destination when the compiler 41 compiles the source code 40 is changed to the parallel processing optimization program 32, so that the source code 40 is compiled. The parallel processing optimization program 32 is thereby executed when the parallel processing is performed.

Incidentally, as benchmarks for evaluating performance of the parallel processing, there is NAS Parallel Benchmarks (NPB). Examples in which the processor 20 with 60 cores 24 is used to evaluate the performance using Embarrassing Parallel (EP) and discrete 3D fast Fourier Transform (FT) in NPB 3.3 OpenMP version will be explained below. An input size is Class B.

Figure 5A:
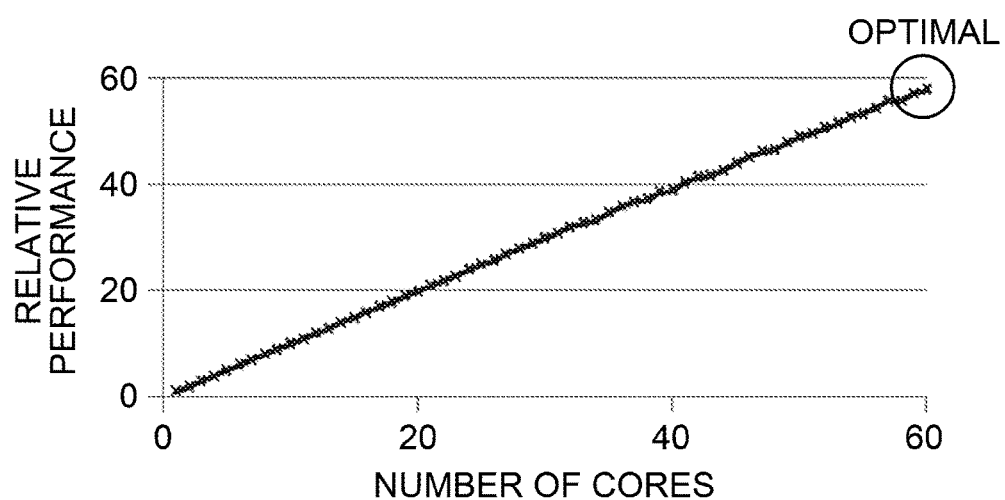
FIG. 5A is a diagram of an example of a performance evaluation result for each number of cores obtained using NPB EP.

FIG. 5A is a diagram of an example of a performance evaluation result for each number of cores obtained using NPB EP. A horizontal axis of FIG. 5A represents the number of cores caused to execute the parallel processing. A vertical axis of FIG. 5A represents relative performance to the performance when the number of cores is 1. The relative performance is, for example, a value obtained by dividing a performance value for each number of cores by a performance value obtained when the number of cores is 1. For the NPB EP, as illustrated in FIG. 5A, higher performance is obtained with increase in the number of cores that performs parallel processing. In the example of FIG. 5A, the highest performance is obtained when the number of cores is 60.

Figure 5B:
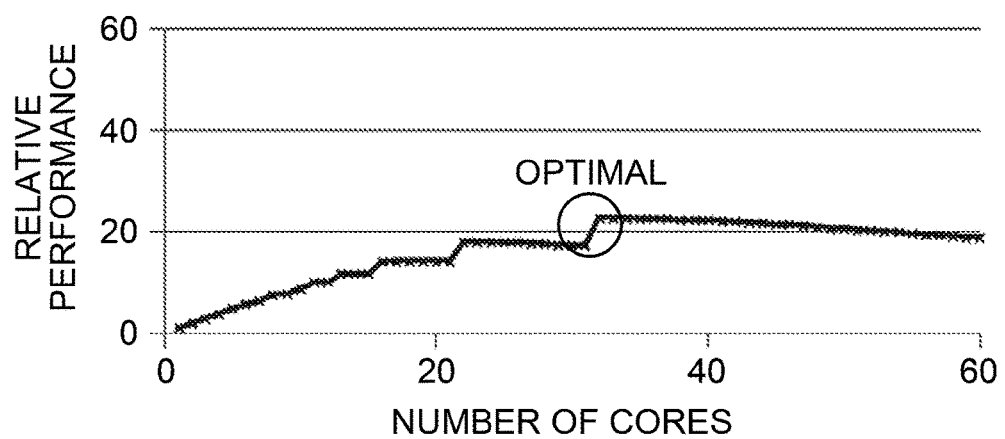
FIG. 5B is a diagram of an example of a performance evaluation result for each number of cores obtained using NPB FT.

FIG. 5B is a diagram of an example of a performance evaluation result for each number of cores obtained using NPB FT. A horizontal axis of FIG. 5B represents the number of cores caused to execute the parallel processing. A vertical axis of FIG. 5B represents relative performance to the performance when the number of cores is 1. For the NPB FT, as illustrated in FIG. 5B, the performance does not uniformly increase in proportion to the number of cores, but the performance is saturated at a specific number of cores and is decreased. For example, in the example of FIG. 5B, the performance reaches its peak when the number of cores is 33. In this way, some of programs can obtain higher performance when the parallel processing is performed using the specific number of cores. For example, in a program with frequent synchronizations between the cores or in a program with bottleneck caused by memory bandwidth, higher performance can be obtained when the parallel processing is performed using the specific number of cores.

Figure 6:
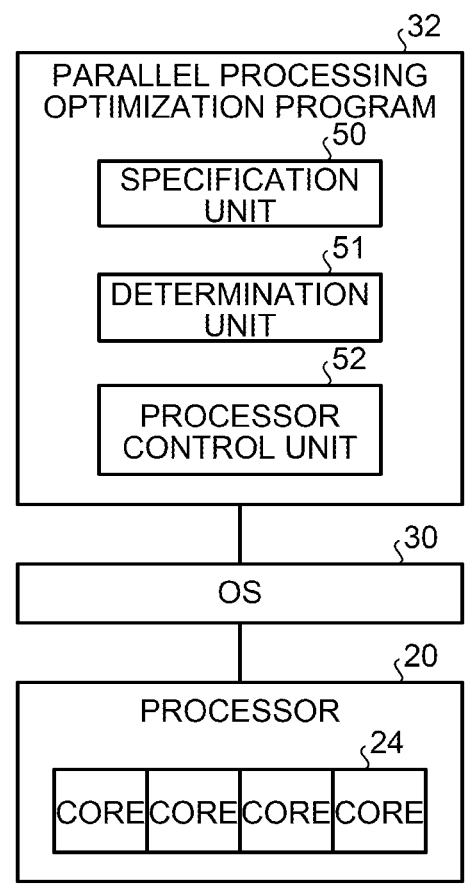
FIG. 6 is a diagram of a functional configuration of executed parallel processing optimization program.

A functional configuration of the executed parallel processing optimization program 32 is explained next with reference to FIG. 6. FIG. 6 is a diagram of a functional configuration of executed parallel processing optimization program. As illustrated in FIG. 6, the parallel processing optimization program 32 controls allocation of the processing to the cores 24 of the processor 20 via the OS 30, and has a specification unit 50, a determination unit 51, and a processor control unit 52.

The specification unit 50 performs various specifications. For example, the specification unit 50 specifies the numbers of cores as a target for performance evaluation.

For example, a case in which the number of iterations N is set to 256 and the number of cores of the processor 20 is set to 60 will be explained herein as an example. In the parallel processing, when the processing is allocated to a plurality of cores, the processing performance is determined based on a time up to completion of the processing in all the cores 24 that perform the parallel processing. In other words, in the parallel processing, the processing performance is determined based on an execution time in a core 24 that completes the processing last.

In the parallel processing, even if the processing capable of being executed in parallel is allocated to the cores 24 by the same amount, it often happens that the number of processings (threads) per core 24 is uneven. Especially, when the number of iterations N is not so large with respect to the number of cores, the processing performance is represented as a stepwise shape due to a difference in the number of processings per core 24. It is assumed that the loop processing in which the number of iterations N is 256 is allocated to each core by the same amount, and, for example, when the parallel processing is performed by 52 cores 24, the maximum number of iterations N allocated to each core is five. It is assumed that the loop processing in which the number of iterations N is 256 is allocated to each core by the same amount, and, for example, when the parallel processing is performed by 60 cores 24, the maximum number of iterations N allocated to each core is also five. In this case, both the allocated maximum numbers of iterations N are five, and therefore the processing performance of the parallel processing using 52 cores 24 and that of the parallel processing using 60 cores 24 are substantially equivalent. In other words, even if the number of cores that performs processing with the parallel processing is changed, the processing performances are substantially equivalent if the maximum numbers of iterations N are the same as each other.

Meanwhile, the more the number of cores that performs processing with the parallel processing, the more the power consumption becomes.

Therefore, the specification unit 50 specifies the numbers of cores executing processing when the processing of the number of iterations is allocated to the cores 24 by the same amount by changing the number of processings to be allocated within a range of the cores capable of executing the parallel processing. For example, when the number of iterations N is set to 256 and the number of cores of the processor 20 is set to 60, and when the number of processings to be allocated is set to "a", the specification unit 50 specifies the numbers of cores executing the processing in the following manner.

The specification unit 50 changes the number of processings a to be allocated one by one in the order from 1, divides the number of iterations N by the number of processings a to be allocated, and calculates a value X obtained by rounding up any fraction after the decimal point of the divided value during a time in which the value X is 1 or greater. Thus, for example, when a=1, then X=256, when a=2, then X=128, when a=3, then X=86, when a=4, then a=5, then X=52, when a=6, then X=43, ..., the values X are calculated in the above manner. Each of the values X is the number of cores that executes the parallel processing when the processings are allocated to each core 24 by each pieces of a.

However, the number of cores of the processor 20 is 60. Therefore, when the value X exceeds 60 that is the number of cores capable of executing the parallel processing, it is not possible to perform parallel processing. Therefore, the specification unit 50 specifies values X within a range in which the value X is 60 or less. For example, in the above example, the values X are specified as 52, 43, 37, 32, 29, 26, 24, 22, 20, 19, ..., 1. Each of the specified values X is the number of cores that executes the processing. Each value X specified by the specification unit 50 is hereinafter called a "Trial Pattern".

Figures 7, 8:
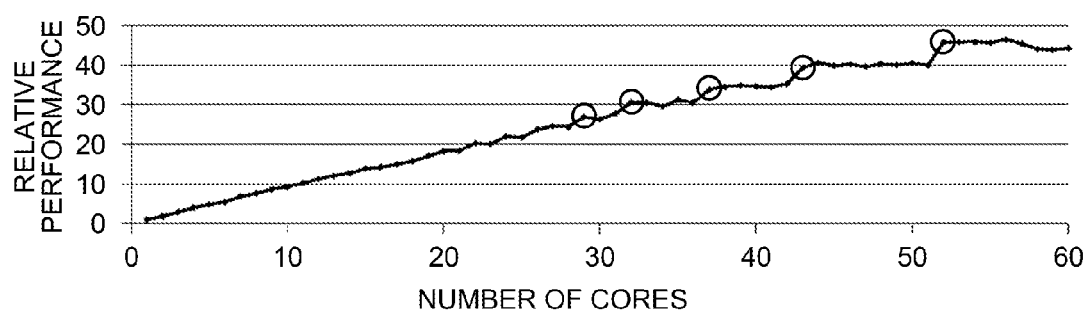
FIG. 7 is a diagram of an example of a performance evaluation result for each number of cores obtained using the NPB FT.
FIG. 8 is a diagram of an example of evaluation results.

FIG. 7 is a diagram of an example of a performance evaluation result for each number of cores obtained using the NPB FT. The example of FIG. 7 is an example of performance for each number of cores executing the parallel processing when the number of cores that performs parallel processing is changed in a range of 1 to 60 and the processing is allocated to the cores 24 by the same amount. A horizontal axis of FIG. 7 represents the number of cores caused to execute parallel processing. A vertical axis of FIG. 7 represents relative performance to the performance when the number of cores is 1. As illustrated in FIG. 7, when the number of iterations N is not so large with respect to the number of cores, the processing performance is represented as a stepwise shape due to a difference in the number of processings per core 24. For example, as illustrated in FIG. 7, the performances are similar to each other in a range in which the number of cores is from 43 to 51. The performances are also similar to each other in a range in which the number of cores is from 52 to 60. The specification unit 50 calculates each number of cores in which the performance is changed in a stepwise manner as a trial pattern. For example, the specification unit 50 specifies numbers of cores such as 52, 43, 37, 32, and 29 which are circled in FIG. 7.

Referring back to FIG. 6, the determination unit 51 performs various determinations. For example, the determination unit 51 determines the number of cores with highest processing performance as the number of cores executing parallel processing from among the numbers of cores specified by the specification unit 50. As an example, the determination unit 51 determines the number of cores that executes parallel processing using a hill-climb method from among the numbers of cores as the trial patterns. For example, the determination unit 51 executes in parallel the processing of iterations N using the cores 24 in order from the larger number of cores from among the numbers of cores as trial patterns to evaluate performances. The determination unit 51 sequentially compares the performances in order from the larger number of cores. When the performance of the small number of cores initially lowers the performance of the large number of cores, then the determination unit 51 determines the number of cores in the large number side as the number of cores executing the parallel processing.

For example, in the example of FIG. 7, the determination unit 51 executes in parallel the processing of the iterations N using 52 cores 24 to evaluate the performance. Then, the determination unit 51 executes in parallel the processing of the iterations N using 43 cores 24 to evaluate the performance. The determination unit 51 then compares the performance in the case of the 52 cores with the performance in the case of the 43 cores. In the example of FIG. 7, the performance in the case of the 43 cores is lower than the performance in the case of the 52 cores. In this case, the determination unit 51 determines the number of cores executing parallel processing as 52.

The determination unit 51 may execute in parallel the processing of the iterations N by each number of cores as the trial pattern specified by the specification unit 50 to calculate the performance and determine the number of cores with the highest processing performance as the number of cores executing the parallel processing.

The processor control unit 52 controls the processor 20 to execute the parallel processing by the number of cores determined by the determination unit 51.

An example of evaluation results of the number of cores determined by the determination unit 51 will be explained herein. FIG. 8 is a diagram of an example of evaluation results. FIG. 8 represents the evaluation results when the performances for the cores have the relationship illustrated in FIG. 7. "Trial Times" is the number of times at which performance is evaluated until the determination unit 51 determines the number of cores executing the parallel processing. "Accuracy" is a value that indicates a prediction accuracy as to whether a performance with highest processing performance can be determined and that is obtained by dividing the processing performance obtained using the determined number of cores by maximum performance.

"Hill-Climb" in FIG. 8 represents evaluation results when the determination unit 51 determines the number of cores executing the parallel processing using the hill-climb method from among the numbers of cores as the trial patterns, in which "Trial Times" is 2 and "Accuracy" is 0.98. "All Searches" in FIG. 8 represents evaluation results when the determination unit 51 calculates each performance of the numbers of cores as the trial patterns and determines the number of cores with the highest processing performance as the number of cores executing the parallel processing, in which "Trial Times" is 28 and "Accuracy" is 0.98.

FIG. 8 also depicts evaluation results when the number of cores executing the parallel processing is determined in a conventional manner without specifying the trial pattern. "Conventional Hill-Climb" in FIG. 8 represents evaluation results when the number of cores executing the parallel processing is determined using the hill-climb method from among 1 to 60 cores illustrated in FIG. 7, in which "Trial Times" is 2 and "Accuracy" is 0.95. "Conventional All Searches" in FIG. 8 represents evaluation results when each performance of all the 1 to 60 cores illustrated in FIG. 7 is calculated and the number of cores with the highest processing performance is determined as the number of cores executing the parallel processing, in which "Trial Times" is 60 and "Accuracy" is 1.00.

In this way, the parallel processing optimization program 32 specifies trial patterns and determines the number of cores executing the parallel processing from among the numbers of cores as the trial patterns, and can thereby calculate the number of cores with high processing performance with high accuracy even when the hill-climb method is used. Moreover, the parallel processing optimization program 32 specifies trial patterns and determines the number of cores executing the parallel processing from among the numbers of cores as the trial patterns, and can thereby calculate the number of cores with high processing performance in a shorter period of time even when "All Searches" is used. When the same amount of processing is to be allocated to each core 24, the parallel processing optimization program 32 specifies a small number of cores to which the processing can be allocated, and can therefore reduce power consumption. That is, the parallel processing optimization program 32 can quickly calculate the number of cores capable of executing the parallel processing with high efficiency.

Flow of Processing

Figure 9:
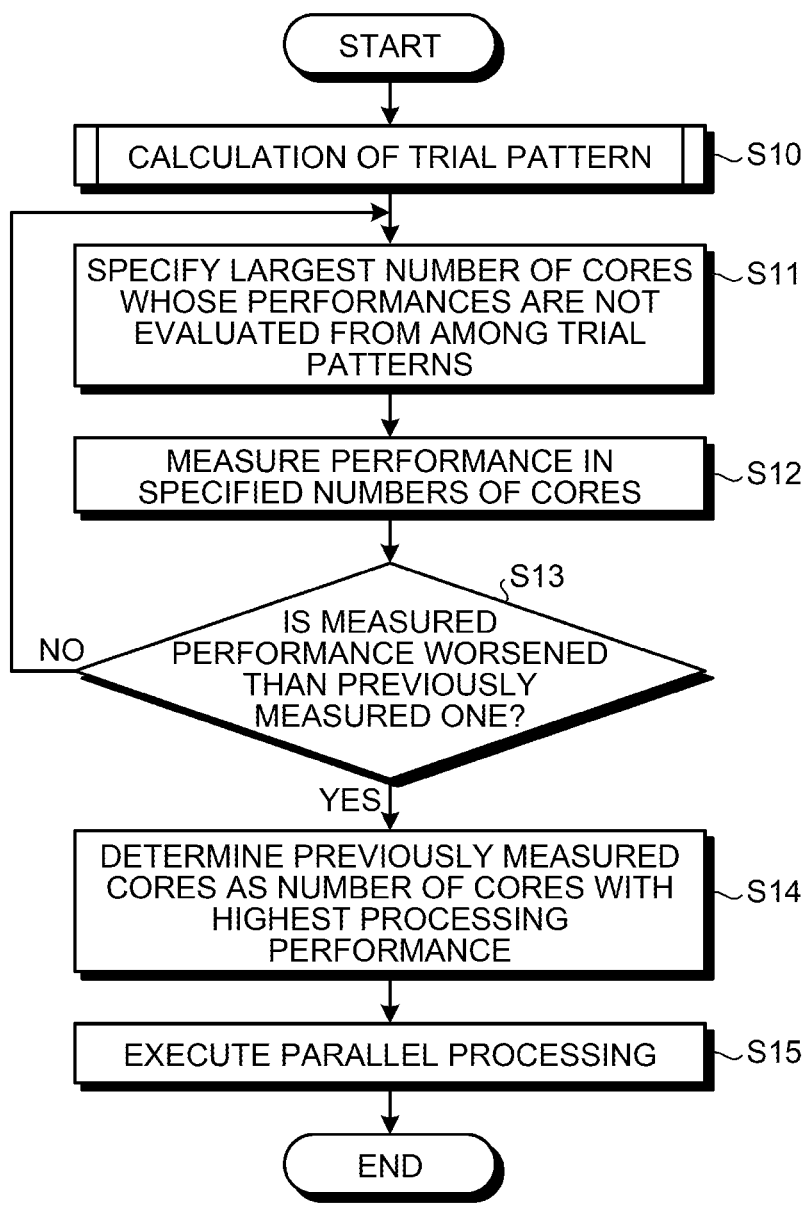
FIG. 9 is a flowchart illustrating an example of a procedure of parallel processing optimization processing according to a first embodiment.

A flow of parallel processing optimization processing for determining the number of cores suitable for the parallel processing when the information processing device 10 according to the present embodiment executes the parallel processing optimization program 32 will be explained next. FIG. 9 is a flowchart illustrating an example of a procedure of parallel processing optimization processing according to the first embodiment. The parallel processing optimization processing is executed, for example, at a timing at which the parallel processing program 31 executes the parallel processing.

As illustrated in FIG. 9, the specification unit 50 executes trial pattern specification processing for specifying a trial pattern, and specifies the trial pattern (S10). Details of the trial pattern specification processing will be explained later.

The determination unit 51 specifies a largest number of threads whose performances are not evaluated, from among the numbers of the cores as specified trial patterns (S11). The determination unit 51 measures performance of the parallel processing in the specified numbers of cores (S12). For example, the determination unit 51 executes in parallel the processing of the iterations N and measures a processing time per one iteration.

The determination unit 51 determines whether the measured performance is worsened than the previously measured performance (S13). For example, when the measured processing time is longer than the previously measured processing time, then the determination unit 51 determines that the performance is worsened. When the performance is not worsened (No at S13), the determination unit 51 proceeds to the processing at S11.

Meanwhile, when the performance is worsened (Yes at S13), then the determination unit 51 determines the previously measured number of cores as the number of cores with the highest processing performance (S14). The processor control unit 52 controls so that the parallel processing is executed by the determined number of cores (S15), and ends the processing.

Figure 10:
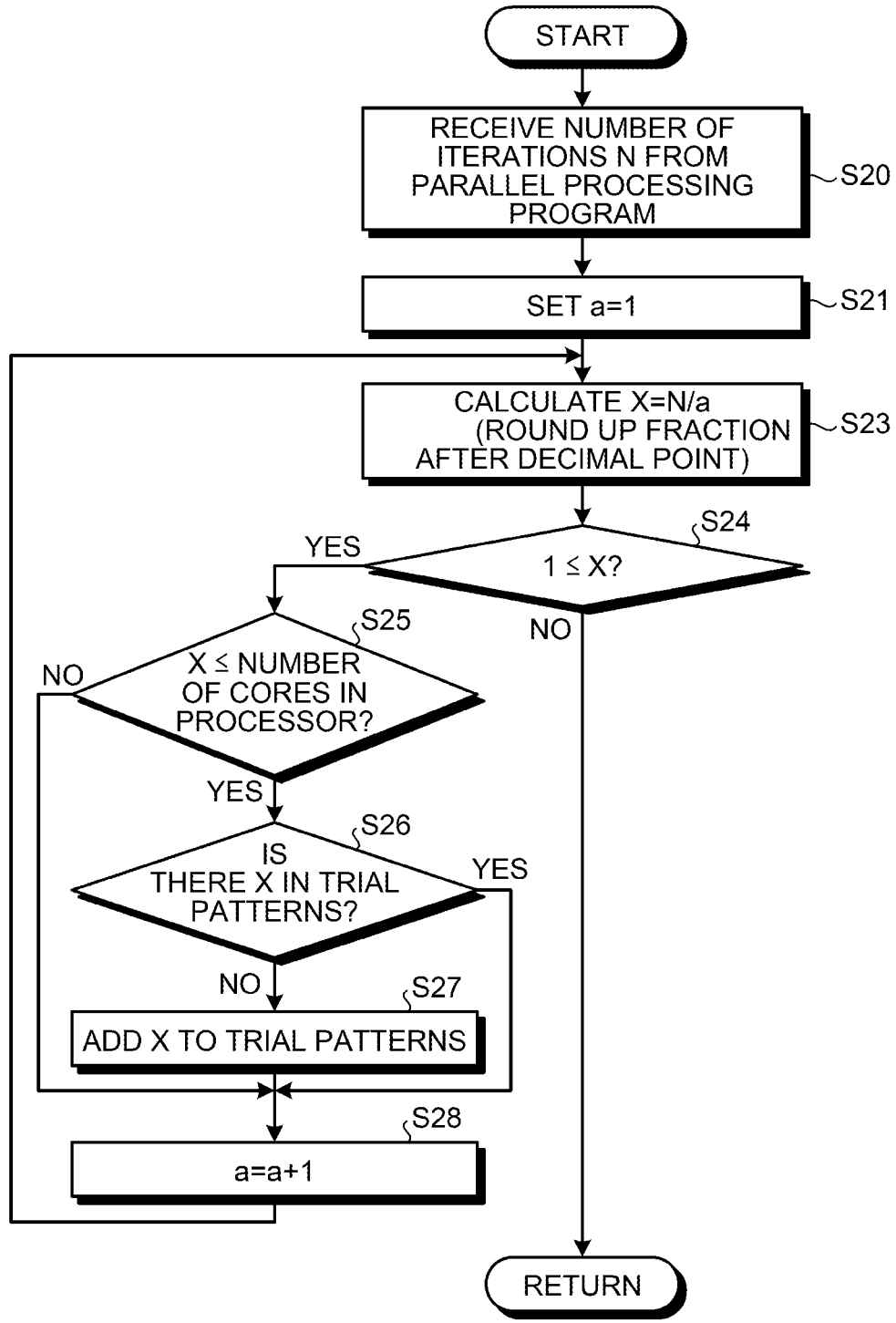
FIG. 10 is a flowchart illustrating an example of a procedure of trial pattern specification processing according to the first embodiment.

A flow of trial pattern specification processing will be explained next. FIG. 10 is a flowchart illustrating an example of a procedure of trial pattern specification processing according to the first embodiment. The trial pattern specification processing is executed, for example, from S10 of the parallel processing optimization processing illustrated in FIG. 9.

As illustrated in FIG. 10, the specification unit 50 receives the number of iterations N of the parallel processing from the parallel processing program (S20). The specification unit 50 initializes a variable a to 1 (S21).

The specification unit 50 divides the number of iterations N by the variable a, and calculates a value X obtained by rounding up any fraction after the decimal point of the divided result (S23). The specification unit 50 determines whether the value X is 1 or greater (S24). When the value X is not 1 or greater (No at S24), the specification unit 50 ends the processing and returns to calling processing. The value X specified by the trial pattern specification processing is the number of cores as the trial pattern.

Meanwhile, when the value X is 1 or greater (Yes at S24), then the specification unit 50 determines whether the value X is the number of cores of the processor 20 or less (S25). When the value X is not the number of cores of the processor 20 or less (No at S25), the specification unit 50 proceeds to the processing at S28 explained later.

On the other hand, when the value X is the number of cores of the processor 20 or less (Yes at S25), then the specification unit 50 determines whether there is already the value X in the trial patterns (S26). When the value X is already in the trial patterns (Yes at S26), the specification unit 50 proceeds to the processing at S28 explained later.

Meanwhile, when the value X is not in the trial patterns (No at S26), the specification unit 50 adds the value X to the trial patterns as the number of cores to be tried (S27). Then, the specification unit 50 adds 1 to the variable a (S28), and proceeds to the processing at S23.

Effects

As explained above, the information processing device 10 according to the present embodiment specifies the numbers of cores executing processings when a predetermined number of processings to be executed in parallel is allocated to each core by the same amount by changing the number of processings to be allocated within a range of the numbers of the cores 24 capable of executing the parallel processing. The information processing device 10 determines the number of cores with the highest processing performance as the number of cores executing the parallel processing from among the specified numbers of cores. This enables the information processing device 10 to quickly calculate the number of cores capable of executing the parallel processing with high efficiency.

The information processing device 10 evaluates performance of the number of cores in order of a larger number thereof from among the specified numbers of cores, sequentially compares the performances, and determines, when the performance of a small number of cores initially lowers the performance of a large number of cores, the number of cores in the large number side as the number of cores executing the parallel processing. This enables the information processing device 10 to more quickly calculate the number of cores executing the parallel processing.

[b] Second Embodiment

A second embodiment will be explained next. Because the configuration of the information processing device 10 according to the second embodiment is substantially the same as that of the first embodiment, the same reference signs are assigned to the same portions as these of the first embodiment, and different portions are therefore mainly explained below.

Figure 11:
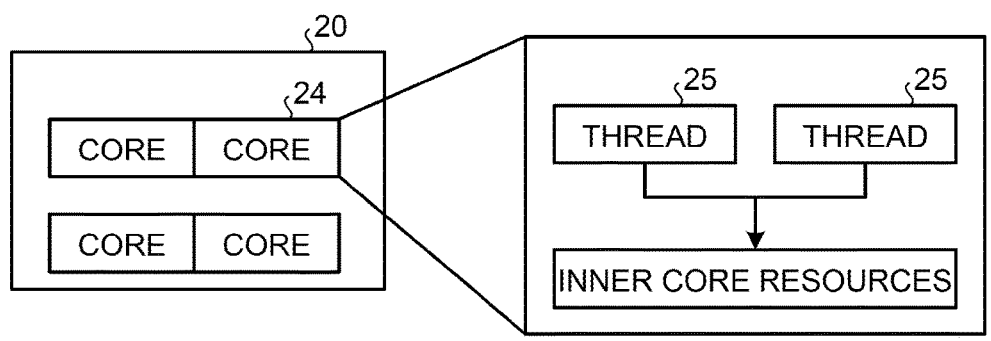
FIG. 11 is a diagram schematically illustrating a configuration of a processor according to a second embodiment.

FIG. 11 is a diagram schematically illustrating a configuration of a processor according to the second embodiment. The processor 20 according to the second embodiment includes, for example, simultaneous multithreading (SMT), and has a plurality of threads 25 capable of executing processing in parallel in each of the cores 24. The thread 25 is a mechanism capable of executing processing of each program, and is also called "Hardware Thread". The thread 25 in each of the cores 24 shares resources such as a memory in the core to execute processing. The example of FIG. 11 represents a case where the core 24 has two threads 25; however, the number of threads 25 is not limited thereto. For example, the Intel Xeon Phi Coprocessor 5110P has 4 threads 25 in each core 24.

For the parallel processing program 31, some of the parallel processing programs can achieve higher performance with increase in the number of threads 25 executing processing in parallel. Moreover, in some of the programs, by stopping part of the cores 24 or part of the threads 25, higher performance can be obtained. For example, because the threads 25 share the resources in the core, by limiting the number of threads to be operated, higher performance may be obtained.

Figure 12A:
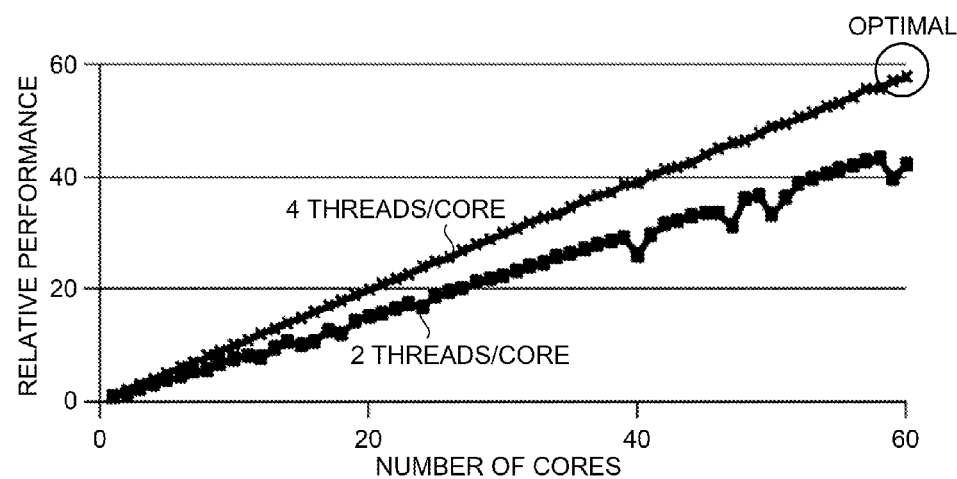
FIG. 12A is a diagram of an example of performance evaluation results for each number of cores obtained using the NPB EP.

FIG. 12A is a diagram of an example of performance evaluation results for each number of cores obtained using the NPB EP. A horizontal axis of FIG. 12A represents the number of cores caused to execute the parallel processing. A vertical axis of FIG. 12A represents relative performance to the performance when the number of threads to be operated is 2 and the number of cores to be operated is 1. FIG. 12A represents performances obtained when two threads 25 are operated by each core 24 and when four threads 25 are operated by each core 24. For the NPB EP, as illustrated in FIG. 12A, higher performance is obtained when the four threads 25 are operated by each core 24, and higher performance is obtained with increase in the number of cores that performs parallel processing. In the example of FIG. 12A, the highest performance is obtained when the number of threads 25 is 4 and the number of cores is 60.

Figure 12B:
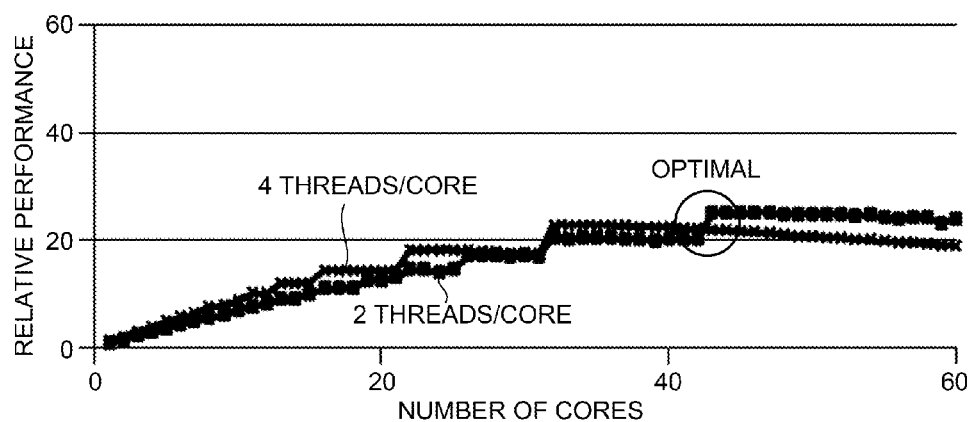
FIG. 12B is a diagram of an example of performance evaluation results for each number of cores obtained using the NPB FT.

FIG. 12B is a diagram of an example of performance evaluation results for each number of cores obtained using the NPB FT. A horizontal axis of FIG. 12B represents the number of cores caused to execute the parallel processing. A vertical axis of FIG. 12B represents relative performance to the performance when the number of threads to be operated is 2 and the number of cores to be operated is 1. FIG. 12B represents performances obtained when two threads 25 are operated by each core 24 and when four threads 25 are operated by each core 24. For the NPB FT, as illustrated in FIG. 12B, in both cases when the numbers of threads operated by each core 24 are 2 and 4, instead of uniformly increasing the performances in proportion to the number of cores, the performances are saturated and lowered at a specific number of cores. Moreover, in the example of FIG. 12B, higher performance is obtained when the number of threads 25 operated by each core 24 is 2. Some programs may obtain higher performance by limiting the number of threads to be operated.

Therefore, the specification unit 50 according to the second embodiment specifies the number of threads and the number of cores executing processing within a range of the number of threads capable of executing the parallel processing of the core 24 and within a range of the number of cores capable of executing the parallel processing. For example, when the number of threads to be operated by each core 24 is changed and processing of the number of iterations is allocated to the threads 25 to be operated by the same amount, then the specification unit 50 specifies the number of threads and the number of cores that execute the processings. For example, when the number of iterations N is 256, the number of cores in the processor 20 is 60, the number of threads to be operated by each core 24 is b, and the number of processings to be allocated to the threads 25 is a, then the specification unit 50 specifies the number of threads and the number of cores that execute the processings in the following manner.

The specification unit 50 changes the number of threads b to be operated one by one in the order from 1, and changes the number of processings a to be allocated one by one in the order from 1 for each number of threads b. Then, the specification unit 50 divides the number of iterations N by a value obtained by multiplying the number of processings a to be allocated by the number of threads b, and calculates a value X obtained by rounding up any fraction after the decimal point of the divided value during a time in which the value X is 1 or greater. Thus, for example, assuming that the number of threads b=4, values X are obtained in the following manner: when a=1, then X=64, when a=2, then X=32 . . . . Assuming that the number of threads b=3, values X are obtained in the following manner: when a=1, then X=86, when a=2, then X=43, . . . . Each of the values X is the number of cores that executes the parallel processing when the threads 25 as the number of threads b are operated by the core 24 and the processing is allocated to the threads 25 by each pieces of a.

The specification unit 50 then specifies a value X within a range in which the value X is the number of cores or less in the processor 20. For example, when the number of cores in the processor 20 is 60, then the number of cores for each number of threads b is calculated in the following manner. Each value X for each number of threads specified by the specification unit 50 is hereinafter called the "Trial Pattern".

Number of threads b=1: X=52, 43, 37, 32, 29, . . . 1
Number of threads b=2: X=43, 32, 26, 22, 19, . . . 1
Number of threads b=3: X=43, 29, 22, 18, 15, . . . 1
Number of threads b=4: X=32, 22, 16, 13, 11, . . . 1

Figures 13, 14:
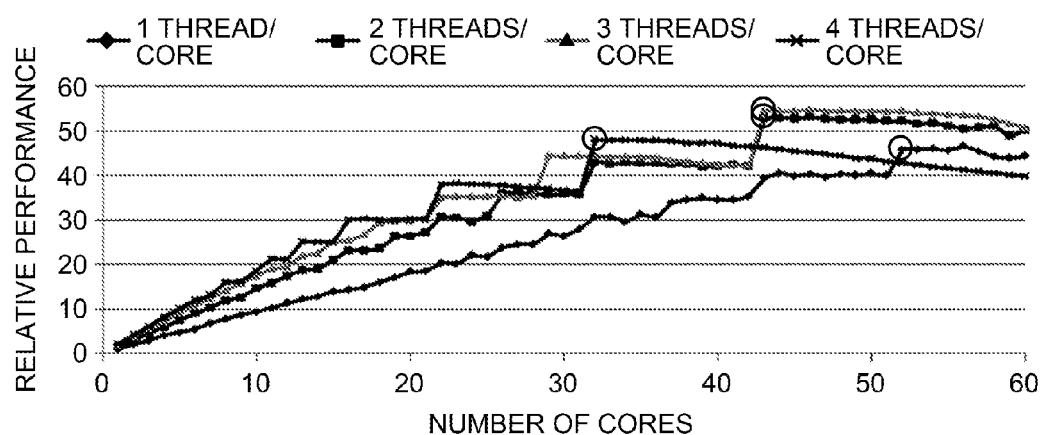
FIG. 13 is a diagram of an example of performance evaluation results for each number of cores obtained using the NPB FT.
FIG. 14 is a diagram of an example of evaluation results.

FIG. 13 is a diagram of an example of performance evaluation results for each number of cores obtained using the NPB FT. The example of FIG. 13 is an example of performance for each number of cores executing the parallel processing when the number of threads to be operated by each core 24 is set to 1 to 4 and the processing is allocated to the cores 24 by the same amount by changing the number of cores executing the parallel processing in a range from 1 to 60. A horizontal axis of FIG. 13 represents the number of cores caused to execute parallel processing. A vertical axis of FIG. 13 represents relative performance to the performance when the number of threads to be operated is 1 and the number of cores is 1. As illustrated in FIG. 13, when the number of iterations N is not so large with respect to the number of cores, the processing performance is represented as a stepwise shape due to a difference in the number of processings per core 24.

The determination unit 51 determines the number of threads and the number of cores with the highest processing performance, from among the threads and the cores specified by the specification unit 50, as the number of threads and the number of cores that execute the parallel processing. As an example, the determination unit 51 calculates the cores with the highest performance using the hill-climb method for each number of threads from among the threads and the cores as the trial patterns. The determination unit 51 then compares performances in the cores with the highest performance for each number of threads, and determines the cores with the highest performance as the number of cores that executes the parallel processing. For example, the determination unit 51 executes in parallel the processing of the iterations N using cores 24 as the number of cores in order from a large number of threads to a large number of cores for each number of threads among the threads and the cores as the trial patterns, and evaluates performances. The determination unit 51 then sequentially compares performances in the order from a larger number of cores for each number of threads, and specifies the number of cores in the large number side, when the performance of the small number of cores initially lowers the performance of the large number of cores, as the number of cores with the highest performance in the number of threads. Then the determination unit 51 determines the number of threads and the number of cores in the large number side when the highest performance of the small number of threads initially lowers the highest performance of the large number of threads, as the number of threads and the number of cores that execute the parallel processing.

For example, in the example of FIG. 13, when the number of threads is 4, the determination unit 51 executes in parallel the processing of the iterations N using 32 cores 24 to evaluate the performance. The determination unit 51 then executes in parallel the processing of the iterations N using 22 cores 24 to evaluate the performance. Then, the determination unit 51 compares the performance in the case of 32 cores with the performance in the case of 22 cores. In the example of FIG. 13, the performance in the case of 22 cores is lower than the performance in the case of 32 cores. In this case, the determination unit 51 determines that the number of cores with the highest performance is 32 when the number of threads is 4.

When the number of threads is 3, the determination unit 51 executes in parallel the processing of the iterations N using 43 cores 24 to evaluate the performance. The determination unit 51 then executes in parallel the processing of the iterations N using 29 cores 24 to evaluate the performance. Then, the determination unit 51 compares the performance in the case of 43 cores with the performance in the case of 29 cores. In the example of FIG. 13, the performance in the case of 29 cores is lower than the performance in the case of 43 cores. In this case, the determination unit 51 determines that the number of cores with the highest performance is 43 when the number of threads is 3.

The determination unit 51 compares the performance in a case of 4 threads and 52 cores with the performance in a case of 3 threads and 43 cores. In the example of FIG. 13, the performance in the case of 3 threads and 43 cores does not lower the performance in the case of 4 threads and 52 cores.

In this case, if a small number of threads is provided, then the performance is likely to become higher. Therefore, when the number of threads is 2, the determination unit 51 executes in parallel the processing of the iterations N using 43 cores 24 to evaluate the performance. The determination unit 51 then executes in parallel the processing of the iterations N using 32 cores 24 to evaluate the performance. Then, the determination unit 51 compares the performance in the case of 43 cores with the performance in the case of 32 cores. In the example of FIG. 13, the performance in the case of 32 cores is lower than the performance in the case of 43 cores. In this case, the determination unit 51 determines that the number of cores with the highest performance is 43 when the number of threads is 2.

The determination unit 51 compares the performance in the case of 3 threads and 43 cores with the performance in the case of 2 threads and 43 cores. In the example of FIG. 13, the performance in the case of 2 threads and 43 cores lowers the performance in the case of 3 threads and 43 cores.

In this case, the determination unit 51 determines the case of 3 threads and 43 cores as the number of threads and the number of cores that execute the parallel processing.

The determination unit 51 may execute in parallel the processing of the iterations N in each number of threads and each number of cores as the trial patterns specified by the specification unit 50 and calculate the performances to determine the number of cores with the highest processing performance as the number of cores executing the parallel processing.

An example of evaluation results of the number of cores determined by the determination unit 51 will be explained herein. FIG. 14 is a diagram of an example of evaluation results. FIG. 14 represents evaluation results when the performances with respect to the number of threads and the number of cores have the relationships illustrated in FIG. 13. "Trial Times" is the number of times at which performance is evaluated until the determination unit 51 determines the number of threads and the number of cores executing the parallel processing. "Accuracy" is value that indicates a prediction accuracy as to whether a performance with the highest processing performance can be determined and that is obtained by dividing the processing performance in the determined number of threads and number of cores by maximum performance.

"Hill-Climb" in FIG. 14 represents evaluation results when the determination unit 51 determines the number of cores executing the parallel processing using the hill-climb method from among the numbers of threads and the numbers of cores as the trial patterns, in which "Trial Times" is 6 and "Accuracy" is 1.00. "All Searches" in FIG. 14 represents evaluation results when the determination unit 51 calculates each performance of numbers of threads and cores as the trial pattern and determines those with the highest performance as the number of threads and the number of cores executing the parallel processing, in which "Trial Times" is 79 and "Accuracy" is 1.00.

FIG. 14 also represents evaluation results when the number of cores executing the parallel processing is determined in the conventional manner instead of specifying the trial pattern. "Conventional Hill-Climb" in FIG. 14 represents evaluation results, in a case of 1 to 4 threads, when the number of cores executing the parallel processing is determined using the hill-climb method from among 1 to 60 cores illustrated in FIG. 13, in which "Trial Times" is 44 and "Accuracy" is 0.99. "Conventional All Searches" in FIG. 13 represents evaluation results, in the case of 1 to 4 threads, when each performance of all the 1 to 60 cores illustrated in FIG. 13 is calculated and the number of cores with the highest processing performance is determined as the number of cores executing the parallel processing, in which "Trial Times" is 240 and "Accuracy" is 1.00.

In this way, the parallel processing optimization program 32 determines the number of threads and the number of cores executing the parallel processing from among the numbers of threads and the numbers of cores as the specified trial patterns, and can thereby calculate the number of cores with high processing performance with high accuracy even when the hill-climb method is used. Moreover, the parallel processing optimization program 32 determines the number of cores executing the parallel processing from among the numbers of threads and the numbers of cores as the trial patterns, and can thereby calculate the number of cores with high processing performance in a shorter period of time even when "All Searches" is used. When the same amount of processing is allocated to each core 24, the parallel processing optimization program 32 specifies a small number of cores to which the processing is allocated, and can therefore reduce power consumption. That is, the parallel processing optimization program 32 can quickly calculate the number of cores capable of executing the parallel processing with high efficiency.

Flow of Processing

Figure 15:
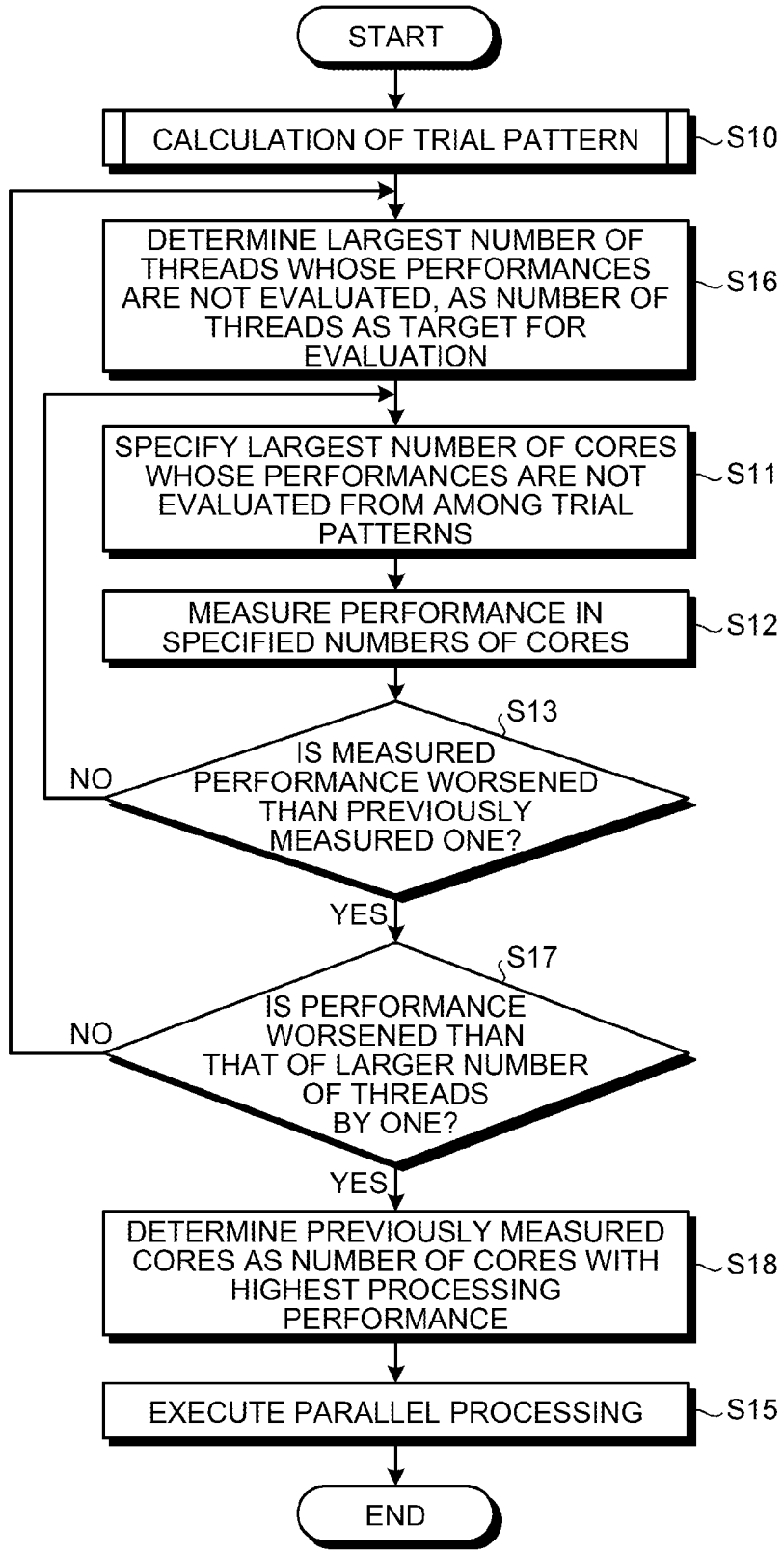
FIG. 15 is a flowchart illustrating an example of a procedure of parallel processing optimization processing according to the second embodiment.

A flow of parallel processing optimization processing for determining the number of cores suitable for the parallel processing when the information processing device 10 according to the second embodiment executes the parallel processing optimization program 32 will be explained next. FIG. 15 is a flowchart illustrating an example of a procedure of the parallel processing optimization processing according to the second embodiment. Because some parts of the parallel processing optimization processing according to the second embodiment are the same as these of the parallel processing optimization processing according to the first embodiment illustrated in FIG. 9, the same reference signs are assigned to the same portions, and different processing is therefore mainly explained below.

The determination unit 51 determines a largest number of threads whose performances are not evaluated, as the number of threads as a target for performance evaluation (S16). For example, when the performances are not evaluated in all the 1 to 4 threads, the determination unit 51 determines the largest value 4 as the number of threads as a target for evaluation. The determination unit 51 performs the processings at S11 to S13 on the number of cores for the number of threads as a target for evaluation. The number of cores with the highest performance is specified in the number of threads as a target for evaluation by the processings at S11 to S13.

The determination unit 51 determines whether the highest performance in the number of threads as a target for evaluation is worsened than the highest performance in the number of threads that is greater by one than the number of threads as a target for evaluation (S17). When the performance is not worsened (No at S17), then the determination unit 51 proceeds to the processing at S16.

Meanwhile, when the performance is worsened (Yes at S17), the determination unit 51 determines the number of cores with the highest performance in the number of threads that is greater by one than the number of threads as a target for evaluation, as the number of threads and the number of cores executing the parallel processing (S18).

Figure 16:
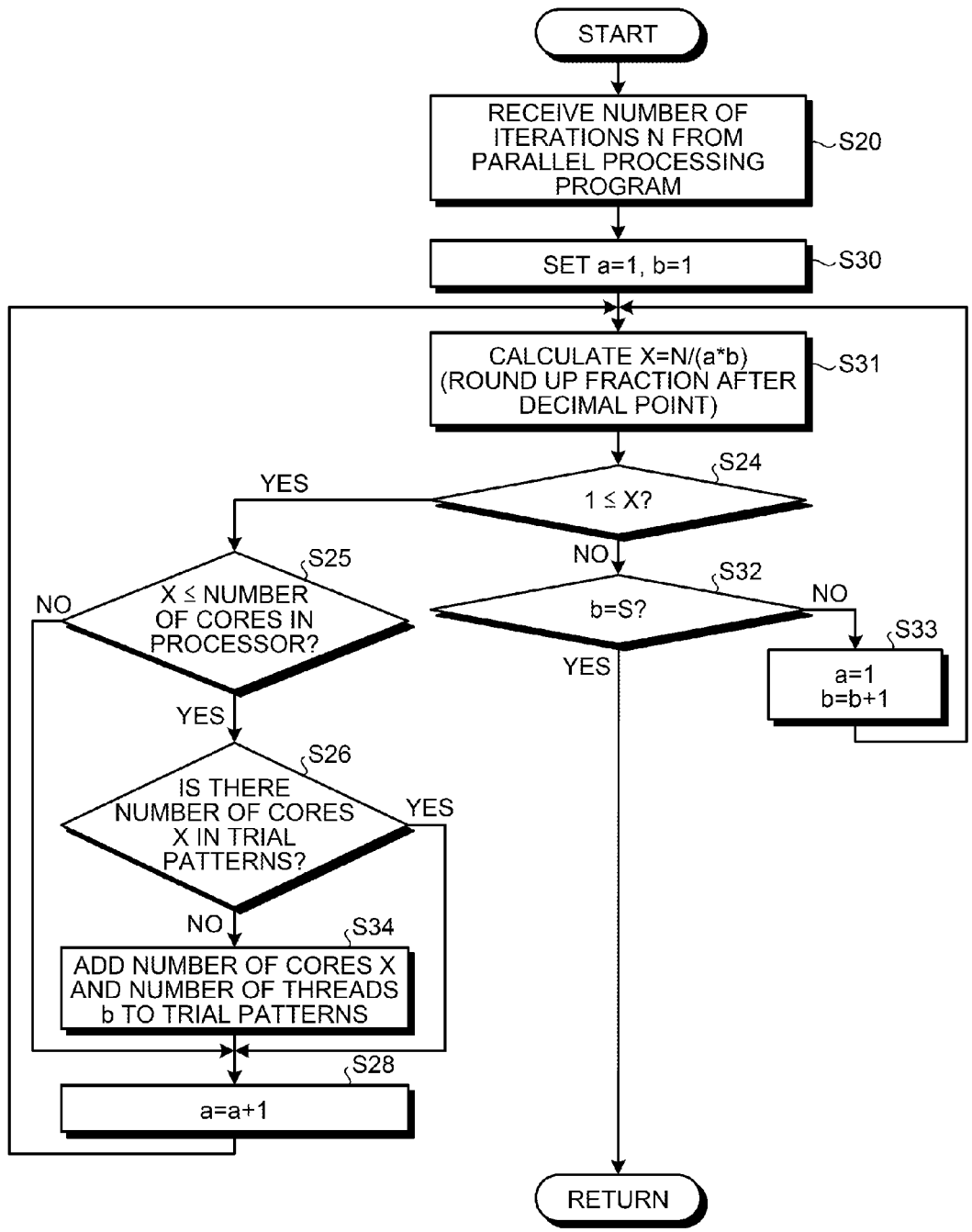
FIG. 16 is a flowchart illustrating an example of a procedure of trial pattern specification processing according to the second embodiment.

A flow of the trial pattern specification processing according to the second embodiment will be explained next. FIG. 16 is a flowchart illustrating an example of a procedure of the trial pattern specification processing according to the second embodiment. Because some parts of the trial pattern specification processing according to the second embodiment are the same as these of the trial pattern specification processing according to the first embodiment illustrated in FIG. 10, the same reference signs are assigned to the same portions, and different processing is therefore mainly explained below.

The specification unit 50 initializes the variable a and a variable b to 1 (S30). The specification unit 50 divides the number of iterations N by a value obtained by multiplying the variable a by the variable b, and calculates a value X obtained by rounding up any fraction after the decimal point of the value as a result of division (S31).

When the value X is not 1 or greater (No at S24), the specification unit 50 determines whether the variable b is a maximum number of threads S that can be operated by the core 24 (S32). When the variable b is the maximum number of threads S (Yes at S32), then the specification unit 50 ends the processing.

Meanwhile, when the variable b is not the maximum number of threads S (No at S32), then the specification unit 50 initializes the variable a to 1, adds 1 to the variable b (S33), and proceeds to the processing at S31.

When there is no value X in the trial patterns (No at S26), then the specification unit 50 adds the value X, to the trial patterns, as the number of cores to be tried when the number of threads is the value of the variable b (S34). In other words, the variable b being the number of threads and the value X being the number of cores are added to the trial patterns.

Effects

As explained above, the information processing device 10 according to the present embodiment specifies the numbers of threads and the numbers of cores executing processings within a range of the numbers of threads capable of executing the parallel processing of the core 24 and within a range of the numbers of the cores capable of executing the parallel processing. The information processing device 10 determines the threads and the cores with the highest processing performance as the number of threads and the number of cores executing the parallel processing from among the specified numbers of threads and numbers of cores. This enables the information processing device 10 to quickly calculate the number of threads and the number of cores capable of executing the parallel processing with high efficiency.

The information processing device 10 evaluates performances in order from a large number of threads to a large number of cores for each number of threads among the specified numbers of threads and numbers of cores, and sequentially compares the performances. The information processing device 10 specifies the number of cores in a large number side, when the performance of a small number of cores initially lowers the performance of the large number of cores, as the number of cores with the highest performance in the specified number of threads. The information processing device 10 determines the number of threads and the number of cores in a large number side, when the highest performance of the small number of threads initially lowers the highest performance of the large number of threads, as the number of threads and the number of cores executing the parallel processing. This enables the information processing device 10 to more quickly calculate the number of threads and the number of cores executing the parallel processing.

Third Embodiment

A third embodiment will be explained next. Because the configuration of the information processing device 10 according to the third embodiment is substantially the same as that of the second embodiment, the same reference signs are assigned to the same portions as these of the first embodiment, and different portions are therefore mainly explained below.

The determination unit 51 according to the third embodiment uses a predetermined prediction model to determine the number of threads and the number of cores executing the parallel processing from among the numbers of threads and the numbers of cores specified by the specification unit 50. For example, the determination unit 51 changes the number of threads for execution to allocate one iteration to the threads of one core 24 and executes the processing, and measures the processing performances in each number of threads. For example, the determination unit 51 measures memory throughput in execution. The determination unit 51 divides the measured memory throughput by the number of threads, and calculates memory throughput per one thread for each number of threads. The determination unit 51 determines the number of threads with least memory throughput per one thread as the number of threads executing the parallel processing.

The determination unit 51 multiplies the memory throughput per one thread in the determined number of threads by the determined number of threads to calculate memory throughput per core. The memory throughput increases in proportion to the number of cores; however, when the memory throughput reaches its peak, then the performance thereof is not improved even if the number of execution cores is increased more than that. Therefore, the determination unit 51 divides a possible peak memory throughput in the information processing device 10 by memory throughput per core, and calculates the number of cores that reaches the peak memory throughput. For example, when the memory throughput per core is 20 and the peak memory throughput is 100, then the determination unit 51 calculates "100/20=5" as the number of cores that reaches the peak memory throughput.

The determination unit 51 may calculate a bandwidth of the memory instead of the memory throughput. For example, when a bandwidth per core is 3% and a maximally usable bandwidth is 100%, then determination unit 51 calculates "100/3=23.3" as the number of cores that reaches the maximally usable bandwidth.

The determination unit 51 then specifies the maximum number of cores, within the number of cores that obtains the peak performance, as the number of cores executing the parallel processing from among the numbers of cores for the numbers of threads executing the parallel processing. For example, it is assumed that the number of threads executing the parallel processing is 1, that the number of threads is 1 and the number of cores as the trial patterns is 52, 43, 37, 32, 29, . . . 1, and that the number of cores that obtains the peak performance is 33.3. In this case, the determination unit 51 specifies 32 being the maximum number of cores within 33.3 as the number of cores executing the parallel processing.

Flow of Processing

Figure 17:
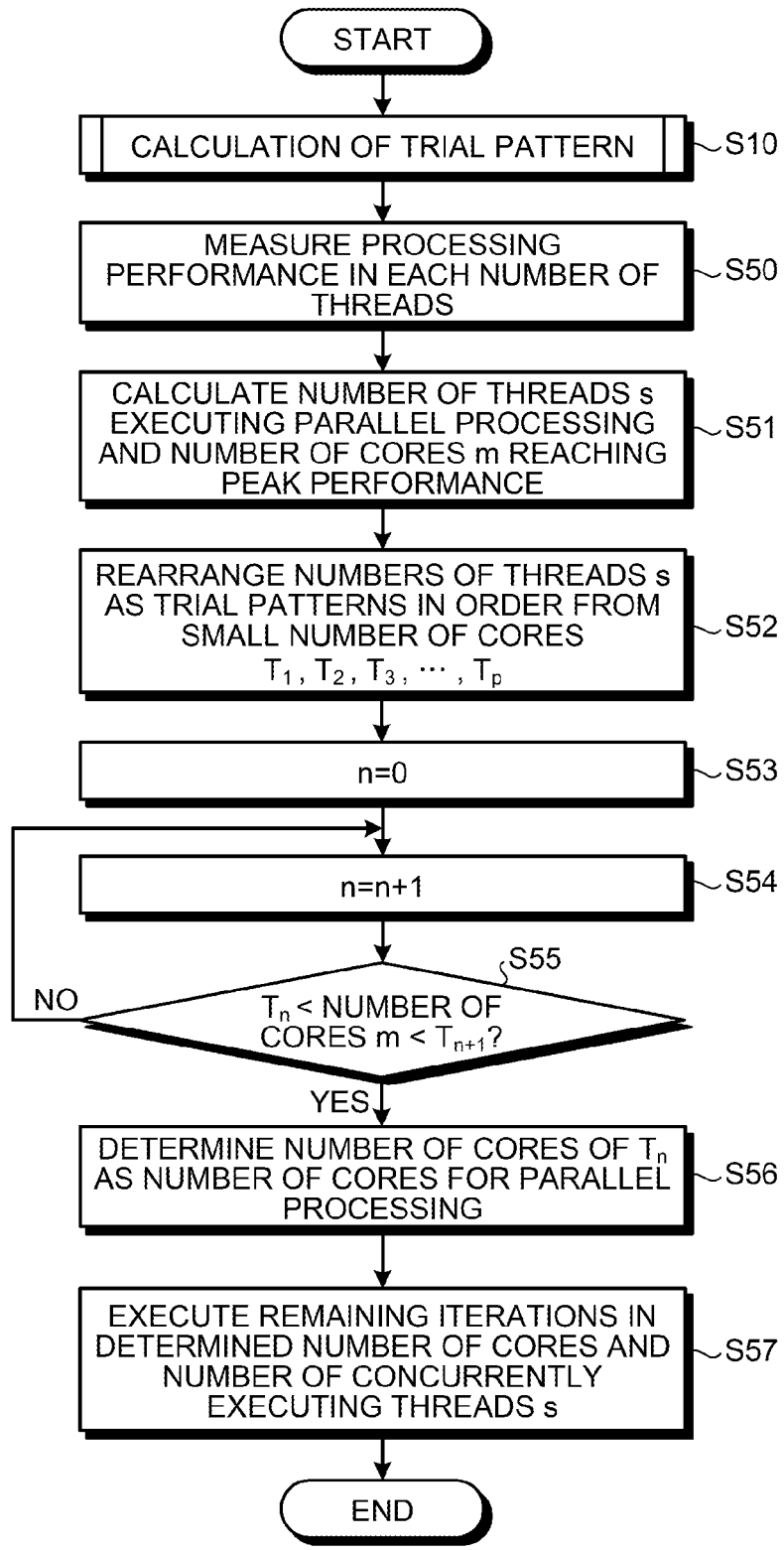
FIG. 17 is a flowchart illustrating an example of a procedure of parallel processing optimization processing according to a third embodiment.

A flow of parallel processing optimization processing for determining the number of cores suitable for the parallel processing when the information processing device 10 according to the third embodiment executes the parallel processing optimization program 32 will be explained next. FIG. 17 is a flowchart illustrating an example of a procedure of the parallel processing optimization processing according to the third embodiment. Because part of the parallel processing optimization processing according to the third embodiment is the same as that of the parallel processing optimization processing according to the second embodiment illustrated in FIG. 15, the same reference sign is assigned to the same portion, and different processing is therefore mainly explained below.

The determination unit 51 changes the number of threads for execution to allocate one iteration to the threads of one core 24 and executes the processing, and measures the processing performances in each number of threads (S50). The determination unit 51 calculates the number of threads s executing the parallel processing and the number of cores m that obtains the peak performance based on the processing performance in each number of threads (S51).

The determination unit 51 arranges the numbers of threads s as the trial patterns in the order from a small number of cores, and sets $T_1, T_2, T_3 \ldots T_p$ in the order of the small number of cores (S52). The determination unit 51 initializes a variable n to 0 (S53). The information processing device 10 then adds 1 to the variable n (S54).

The determination unit 51 determines whether $T_n$<number of cores m<$T_{n+1}$ is satisfied (S55). When $T_n$<number of cores m<$T_{n+1}$ is not satisfied (No at S55), then the determination unit 51 proceeds to the processing at S54.

Meanwhile, when $T_n$<number of cores m<$T_{n+1}$ is satisfied (Yes at S55), then the determination unit 51 determines the number of cores of $T_n$ as the number of cores executing the parallel processing (S56). The processor control unit 52 controls so that processing of remaining iterations is executed in parallel in the number of threads s and the determined number of cores (S57), and ends the processing.

Effects

As explained above, the information processing device 10 according to the present embodiment uses the predetermined prediction model to determine the number of threads and the number of cores executing the parallel processing from among the specified numbers of threads and numbers of cores. This enables the information processing device 10 to more quickly calculate the number of threads and the number of cores executing the parallel processing.

Fourth Embodiment

Although the embodiments of the disclosed device have been explained so far, the disclosed technology may be implemented by various different embodiments other than the embodiments. Therefore, other embodiments included in the present invention will be explained below.

For example, the embodiments have explained the case where the number of threads and the number of cores executing parallel processing are determined upon execution of the parallel processing; however, the disclosed system is not limited thereto. For example, when the parallel processing to be executed is previously known such that the parallel processing is periodically performed, the number of threads and the number of cores may be determined before execution of the parallel processing.

The illustrated components of the devices are functionally conceptual, and therefore the components are not necessarily configured as physically illustrated ones. In other words, specific states of how the devices are distributed or integrated are not limited to the illustrated ones, and whole of or part of the components can be functionally or physically distributed or integrated by arbitrary units according to various loads and usages. For example, the processing units such as the specification unit 50, the determination unit 51, and the processor control unit 52 in the parallel processing optimization program 32 may be appropriately integrated. The processing of each of the processing units may be appropriately separated into processings in a plurality of processing units. Furthermore, the parallel processing optimization program 32 may be formed from a plurality of programs, and may be separately disposed in a plurality of devices.

The parallel processing optimization program 32 does not need to be stored in the DISK 21 from the beginning.

For example, the program is stored in a "portable physical medium" such as a flexible disk (FD), a compact disk read only memory (CD-ROM), a digital versatile disc (DVD), a magneto-optical disc, or an integrated circuit (IC) card that is inserted into the information processing device 10. Then, the information processing device 10 may read the program therefrom to execute the read program.

Furthermore, the program is previously stored in "other computer (or server)" connected to the information processing device 10 via a public line, the Internet, a local area network (LAN), a wide area network (WAN), or the like. Then the information processing device 10 may read the program therefrom to execute the read program.

According to one aspect of the present invention, it is possible to quickly calculate the number of cores capable of executing the parallel processing with high efficiency.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process, the process comprising:

specifying a first set of numbers of cores of a processor, wherein cores of a number in the first set execute a predetermined number of processings of a program to be executed in parallel and each execute a first number of processings or less allocated thereto among the predetermined number of processings of the program, by gradually increasing the first number of processings to be allocated to a core by 1 from 1 to the predetermined number of processings of the program, a largest number in the first set not exceeding a predetermined number of cores provided in the processor, a smallest number in the first set being 1;

evaluating processing performance of cores, by executing the program in parallel by cores of a number in order from a highest number among the specified first set, and sequentially comparing the processing performance of cores, and determining a first number of cores, when processing performance of cores of a second number next smaller than the first number among the specified first set initially lowers from processing performance of cores of the first number, as a number of cores executing parallel processing.

2. The non-transitory computer-readable recording medium according to claim 1, wherein the cores each include a plurality of threads capable of executing parallel processing, the specifying includes:

specifying a second set of numbers of threads and numbers of cores of the processor, wherein threads of a number in the second set each execute a second number of processings or less allocated thereto among the predetermined number of processings of the program, by gradually decreasing a number of threads to be operated in each core by 1 from a maximum number of threads that are included in the core to 1 and by gradually increasing by 1 the second number of processings to be allocated to an operated thread, and the determining includes:
determining from the specified second set a number of threads and a number of cores with highest of processing performance, a processing performance being evaluated by executing the program in parallel by threads of a number and cores of a number in the specified second set, as a number of threads and a number of cores executing the parallel processing.

3. The non-transitory computer-readable recording medium according to claim 2, wherein the determining includes:
evaluating processing performance of threads and cores in order from a highest number of threads and from a highest number of cores for each number of threads among the specified second set, by sequentially comparing the processing performance of threads and cores,
specifying, for a number of threads, a first number of cores, when processing performance of cores of a second number next smaller than the first number among the specified second set initially lowers from processing performance of cores of the first number, as a number of cores with highest processing performance in the number of threads, and
determining a first number of threads, when highest processing performance of threads of a second number next smaller than the first number initially lowers from highest processing performance of threads of the first number, as a number of threads and a number of cores that execute the parallel processing.

4. A parallel processing optimization method executed by a computer, the method comprising:
specifying a first set of numbers of cores of a processor, wherein cores of a number in the first set execute a predetermined number of processings of a program to be executed in parallel and each execute a first number of processings or less allocated thereto among the predetermined number of processings of the program, by gradually increasing the first number of processings to be allocated to a core by 1 from 1 to the predetermined number of processings of the program, a largest number in the first set not exceeding a predetermined number of cores provided in the processor, a smallest number in the first set being 1;
evaluating processing performance of cores, by executing the program in parallel by cores of a number in order from a highest number among the specified first set, and sequentially comparing the processing performance of cores, and
determining a first number of cores, when processing performance of cores of a second number next smaller than the first number among the specified first set initially lowers from processing performance of cores of the first number, as a number of cores executing parallel processing.

5. An information processing device comprising:
a plurality of cores capable of executing parallel processing;
a specification unit that specifies a first set of numbers of cores of a processor, wherein cores of a number in the first set execute a predetermined number of processings of a program to be executed in parallel and each execute a first number of processings or less allocated thereto among the predetermined number of processings of the program, by gradually increasing the first number of processings to be allocated to a core by 1 from 1 to the predetermined number of processings of the program, a largest number in the first set not exceeding a predetermined number of cores provided in the processor, a smallest number in the first set being 1;
a determination unit that evaluates processing performance of cores, by executing the program in parallel by cores of a number in order from a highest number among the specified first set, and sequentially comparing the processing performance of cores, and determines first number of cores, when processing performance of cores of a second number next smaller than the first number among the specified first set initially lowers from processing performance of cores of the first number, as a number of cores executing parallel processing.

\* \* \* \* \*